May 2, 1944. W. H. WEEDEN 2,347,858
RECEPTACLE FILLING MACHINE
Filed June 14, 1940 2 Sheets-Sheet 1
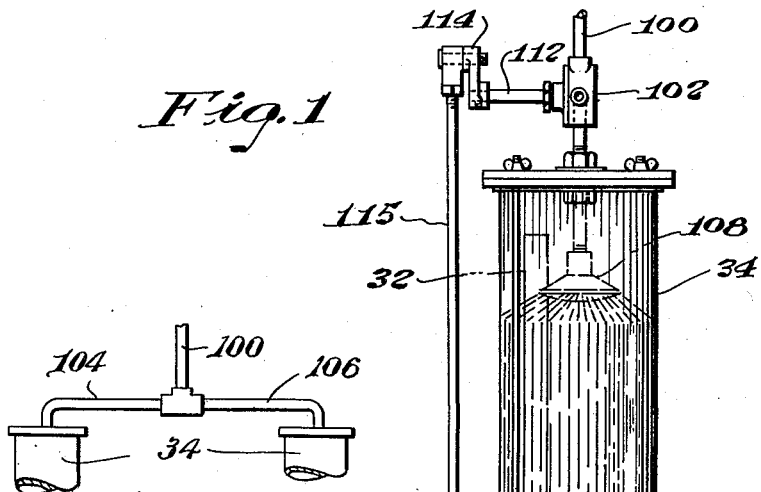
Fig.1
Fig.4
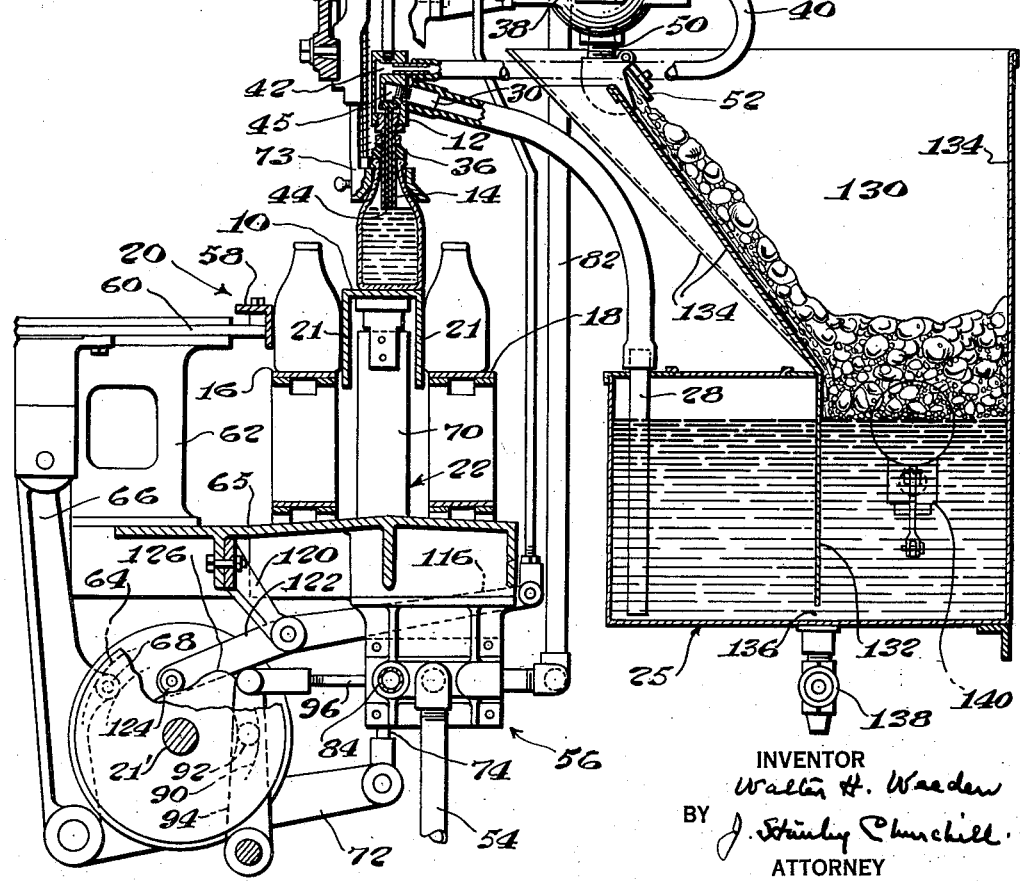
INVENTOR
Walter H. Weeden
BY J. Stanley Churchill
ATTORNEY May 2, 1944.    W. H. WEEDEN    2,347,858
RECEPTACLE FILLING MACHINE
Filed June 14, 1940    2 Sheets-Sheet 2
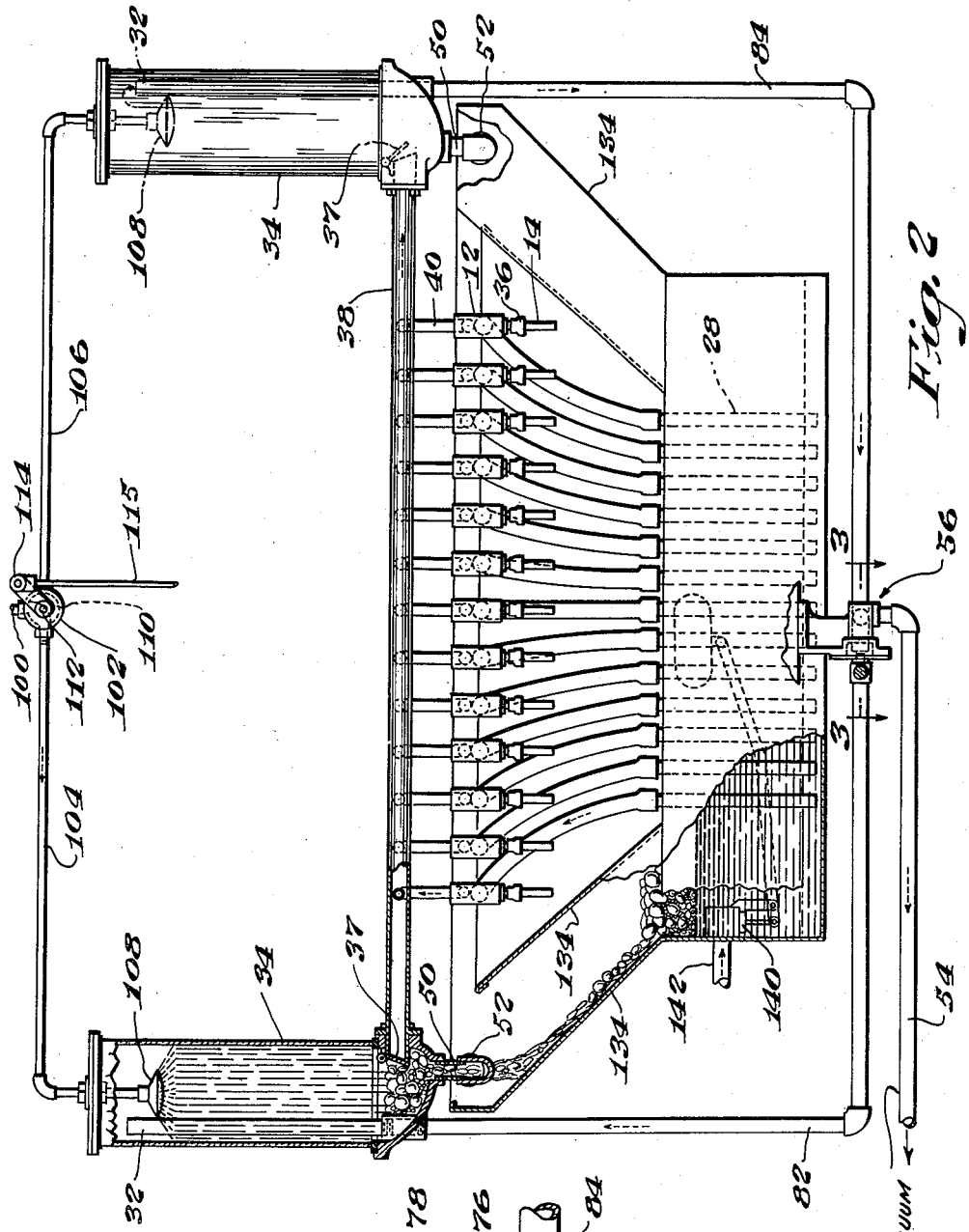
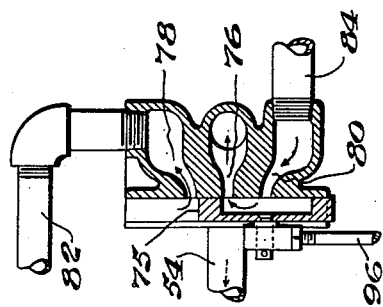
INVENTOR
Walter H. Weeden
BY J. Stanley Churchill
ATTORNEY Patented May 2, 1944

2,347,858

UNITED STATES PATENT OFFICE 2,347,858

RECEPTACLE FILLING MACHINE

Walter H. Weeden, Milton, Mass., assignor to Pneumatic Scale Corporation, Limited, Quincy, Mass., a corporation of Massachusetts Application June 14, 1940, Serial No. 340,487

9 Claims. (Cl. 226—116)

This invention relates to a receptacle filling machine.

The invention has for an object to provide a novel and improved receptacle filling machine in which provision is made for eliminating certain difficulties formerly encountered when filling receptacles with liquids having a tendency to produce foam or froth when agitated.

A further object of the invention is to provide a novel and improved receptacle filling machine operating upon the vacuum principle for handling liquids having a tendency to produce foam and in which provision is made for dispersing and dissipating the foam produced during the filling operation, whereby to enable the machine to operate efficiently when filling containers with such liquids.

With these general objects in view and such others as may hereinafter appear, the invention consists in the receptacle filling machine and in the various structures, arrangements and combinations of parts hereinafter described and particularly defined in the claims at the end of this specification.

In the drawings illustrating the preferred embodiment of the invention, Fig. 1 is a transverse cross-sectional view of a sufficient portion of a receptacle filling machine embodying the present invention to enable it to be understood; Fig. 2 is a front elevation of the vacuum filling system shown in Fig. 1, having portions broken away and in cross-section; Fig. 3 is a sectional view of a slide valve to be referred to, the section being taken on the line 3—3 of Fig. 2, and Fig. 4 is a diagrammatic view of a modified form of the invention.

In general, the different features of the invention are illustrated as embodied in a machine for filling bottles, and such a machine may preferably comprise one operating on the vacuum principle, as disclosed in the United States patent to Pennock, No. 1,737,677, issued December 3, 1929. In general, such prior bottle filling machines comprises a bottle supporting member arranged to elevate the bottle into sealing engagement with a filling head forming part of a vacuum filling mechanism. In operation, the air in the bottle to be filled is evacuated whereupon the liquid is drawn up into the bottle from a supply tank. The filling heads are preferably provided with filling nozzles which extend into the bottle, and when the liquid has reached a predetermined height in the bottle, that is, to the lower end of the nozzle, the surplus liquid is drawn up into an overflow bowl or vacuum chamber. When the filling operation is completed the overflow bowl is opened to atmospheric pressure whereupon the surplus liquid is permitted to flow by gravity back into the supply tank.

In practice, when operating with liquids which are substantially free from foam producing characteristics, such machines have proved to be highly satisfactory. However, when the liquid to be run is of a nature such as to produce foam upon agitation of the liquid, such as liquid soap, floor wax, shellac, etc., difficulty has been experienced in that the overflow bowl became filled with foam during the filling operation, and when the vacuum was discontinued and the bowl opened to atmospheric pressure, the foam, because of its light and airy character, did not flow out through the drain but remained suspended in the overflow bowl until the latter was again subjected to vacuum during another filling operation. Subsequent filling operations built up more foam in the chamber until the foam finally arrived in a position to be drawn into the air lines to the vacuum pump. As a result, the air lines eventually became plugged or the material entering the vacuum pump soon destroyed the efficiency thereof.

In accordance with the present invention provision is made for subjecting the foam accumulated in the vacuum chamber to a spray of the liquid with which the containers are being filled but delivered from a separate source, to thereby effect dissipation of most of the air bubbles of the foam and to wash the remaining foam with the liquid out of the chamber through a drain and into the supply tank. Provision may be made, as herein shown, for turning on the spray at periodic intervals, that is, during the time when the vacuum chamber is released to atmospheric pressure, or the spray may be continuously operated in the bowl during both the vacuum and atmospheric pressure periods of operation without affecting the filling operation, whereby the spray is effective to break up the foam formation as it is formed or accumulated in the chamber.

Another feature of the present invention resides in the construction and disposition of the drain pipe and valve through which the foam and liquid are arranged to pass from the chamber to the supply tank. Heretofore, such pipe and valve have been disposed so as to extend down into the liquid of the supply tank or directly above the liquid. Such disposition of the parts necessitated a relatively long drain pipe and as a result any foam passing through the pipe would be restricted and impeded. In the present embodiment of the invention, the drain pipe is made relatively short and with the drain valve disposed a substantial distance above the supply tank. As a result of the relatively short drain passage, the foam is permitted to pass out of the chamber more readily. In practice, it was found that with some liquids, this feature alone, without the liquid spray, would serve to efficiently empty the chamber of foam. Provision is also made for directing the foam thus removed from the chamber into a separate compartment of the supply tank where it may remain to gradually dissipate.

Referring now to the drawings, which illustrate the different features of the invention as embodied in a bottle filling machine operating on the vacuum principle, 10 represents a bottle supporting member which is adapted to operatively support a plurality of bottles. The machine is further provided with a plurality of filling heads 12 including nozzles 14, and provision is made for elevating the bottle supporting member to bring the mouth of the bottles into sealing engagement with said filling heads to enable the filling operation to be performed. Provision is preferably made for feeding the bottles to be filled into the machine upon an incoming conveyer 16 and for discharging the filled bottles from the machine upon a discharge conveyer 18.

In the operation of the machine, the bottles to be filled are deposited on the incoming conveyer 16 which operates to position the bottles in front of the bottle transfer mechanism indicated generally at 20. The bottle transfer mechanism operates to push the row of bottles from the incoming conveyer 16 onto the bottle supporting and elevating member 10, when the latter is in its lowered position flush with the conveyers. At the same time, the row of filled bottles on the supporting platform 10 are pushed onto the outgoing conveyer 18 to be discharged from the machine. The bottle supporting member 10 is provided with depending side portions 21 to form guides for the incoming and outgoing bottles when the elevator is in its raised position.

The bottle transfer mechanism 20 and the elevating mechanism indicated generally at 22, are arranged to be operated automatically at predetermined times in the cycle of operation of the machine through connections from a cam shaft 21' to transfer a new set of bottles onto the elevating platform and discharge the previously filled set and to elevate the new set of bottles into operative position with the filling heads. As herein shown, the bottle pushing mechanism comprises a bar 58 mounted on a slide 60, guided in brackets 62 mounted on the platen 65 of the machine. The slide has a reciprocating motion imparted to it by a cam 64 which cooperates with a cam roll 68 carried by a lever 66 to which the slide 60 is operatively connected. The cam 64 is fast on the cam shaft 21'. The bottle elevating member 10 is mounted upon a slide 70 vertically movable in suitable guides formed in the platen 65 and is arranged to be actuated by a cam fast on the cam shaft 21' by connections including a lever 72 and link 74. Reference is made to the patent to Newey, No. 1,977,138, for a further disclosure and description of the bottle transfer and elevating mechanisms. As illustrated in Fig. 1, the usual mechanism including the yieldably mounted guide member 73 is provided for guiding the necks of the bottles into alignment with their respective filling heads.

As above described, the filling mechanism preferably employed may in general comprise mechanism constructed and operated in accordance with the United States patent to Pennock, No. 1,737,677, to which reference may be made. For the purpose of understanding the present invention, it is thought sufficient to state that the bottles are filled by the well known vacuum principle as clearly set forth in said Pennock patent. The liquid with which the bottles are to be filled is contained in a supply tank 25 located at the back of the machine and below the level of the bottles to be filled. The liquid is drawn into the bottle through a suction pipe 28, one end of which is immersed in the liquid in the tank, and the other end of which is connected to the filling head 12 by a nipple 30 by vacuum created within the bottle. A vacuum pump, not shown, of any well known construction is connected to a pipe 32 which leads into and has an opening at the top of a closed chamber 34. A vacuum is created in the bowl 34 by the suction pump and when the mouth of the bottle is sealed by the rubber collar 36 as shown in Fig. 1, the vacuum in the bowl operates through a check valve 37, see Fig. 2, a pipe 38, a flexible tubing 40 and a passageway 42 extending down through the filling head 12 and nozzle 14 into the inside of the bottle to evacuate the bottle. The bottle is connected with the suction pipe 28 by an inner tubular nozzle 44 disposed concentrically inside the nozzle 14, and in operation, when the air is exhausted from the bottle to be filled, the liquid in the supply tank 25 will be caused to flow through the suction pipe 28, into a chamber 45 in the filling head and thence through the tube 44 into the bottle to fill the same.

When the bottle is filled so that the liquid reaches the bottom of the filling nozzle 14, the suction from the vacuum pump draws off any further liquid coming into the bottle, up through the nozzle 14, chamber 42, flexible tube 40 and into the overflow bowl or vacuum chamber 34, and the surplus liquid may subsequently be drained back into the tank 25, thus filling all the bottles to the same height.

It will be observed that the filling operation automatically commences when the elevator 10 lifts the bottles to the filling position and is completed before the elevator again descends. When the elevator 10 descends and the contact is broken between the rubber collar 36 and the mouth of the bottle, the suction in the bottle is broken and the flow of liquid from the tank 25 through the filling heads 12 is terminated. Any surplus liquid that is drawn into the overflow bowl 34 finds its way back to the tank 25 through a drain pipe 50 which is provided on its end with a check valve 52 for preventing the flow of liquid through this pipe when the chamber 34 is under vacuum.

As illustrated in Fig. 2, two overflow bowls or vacuum chambers 34 are preferably used, and the suction line 54 from the vacuum pump may be connected through a slide valve 56 designed to operate periodically to release the vacuum on the bowls alternately. As herein shown, see Fig. 3, the slide valve 56 may comprise a sliding member 75 adapted to be moved to connect the vacuum port 76 alternately with the ports 78 and 80 respectively. The ports 78 and 80 are connected by pipe lines 82, 84 to the left and right hand chambers 34 respectively as viewed in Fig. 2. It will be observed that when one of the chambers 34 is under vacuum, the other is open to atmospheric pressure so that in operation, while one chamber is under vacuum and is receiving the surplus liquid from the filling operation, the other chamber is permitted to drain into the supply tank 25. The slide member 75 is operated in timed relation to the elevating and transferring mechanisms through connections from the cam shaft 21' including the cam 90, roller 92, lever 94, and link 96.

In accordance with the illustrated embodiment of the invention, provision is made for projecting a spray or stream of the same liquid from a source of supply into the chambers 34 during the time when the latter are under atmospheric pressure, or in other words, during the draining period of the chamber, in order to wash out any foam or froth which has accumulated therein during the bottle filling period. As herein shown, the liquid may be supplied by gravity through a pipe 100 from an overhead tank, not shown, and through a rotary valve 102 adapted to direct the liquid alternately through either pipe 104, 106 leading to the left and right hand chambers 34 respectively. Each pipe 104, 106 is provided with a spray head 108 disposed near the top of the chamber and arranged to project a stream of the liquid down the sides of the chamber and over the whole area within the chamber. The valve 102 includes a crescent shaped valve member 110 adapted to alternately cover and uncover the ports to the pipes 104, 106.

As illustrated in Fig. 1, provision is made for operating the valve 102 in timed relation to the filling operations to alternately direct the liquid first into one chamber and then into the other, through connections from the cam shaft 21', and as herein shown, the valve shaft 112 is provided with a lever 114 which is connected by a link 115 to one arm 116 of a cam lever pivotally mounted in a bracket 120. The other arm 122 of the cam lever is provided with a roller 124 which cooperates with a cam 126 fast on the cam shaft 21'. Thus, each chamber 34 is alternately subjected to a spray or stream of the liquid, during the operation of the filling machine and the spraying operation is arranged to coincide with the draining period of the respective chamber. Although, in the preferred form of the invention, the liquid is permitted to enter the chambers 34 through the pipes 104, 106 by gravity, it will be apparent that the liquid may be pumped in under pressure, if desired.

While, as herein illustrated and described, provision is preferably made for controlling the foam dispersing streams to be operative only during the time when the chambers are under atmospheric pressure, if desired, the streams may be operated continuously, as diagrammatically illustrated in Fig. 4, by elimination of the above described control mechanism, and thus operate to break up and dissipate the foam as it is formed in the chambers during the filling operation. Although this system would effect a slight acceleration of the incoming stream through the pipes 104, 106 when the chamber was under vacuum, it was found that this was not objectional and the filling operation was in no way affected thereby. In some instances, where the material being run possesses less foam producing tendency, provision may be made for manually controlling the streams so that the operator may turn on the streams to clear out the bowls at any time it becomes necessary. The chambers 34 are made of glass so that the foam accumulated in the chambers is easily visible.

As hereinbefore stated, the drain pipe 50 is made relatively short so as to offer minimum resistance to the flow of the foam and liquid through the drain. The drain is arranged to empty into the supply tank 25, and as herein shown, the supply tank 25 is provided with an enlarged compartment 130 divided from the main body of liquid by a partition plate 132. The enlarged compartment is provided with extended sides 134 and is arranged to hold a large volume of the accumulated foam drained from the chambers 34. The foam thus held is permitted to gradually return to its liquid condition to join the main body of liquid in the supply tank. It will be observed that the partition plate 132 is provided with an opening 136 at the bottom so that only liquid may enter the suction pipe compartment thus preventing foam from being drawn up by the suction lines 28 into the bottles. The usual drain valve 138 is provided in the bottom of the tank and a float valve 140 is arranged in the tank to control the inlet through the pipe 142 from the source of supply. It will be observed that the liquid permitted to enter through the spray heads 108 also serves to form a source of supply to the tank 25.

From the above description, it will be observed that the present invention, when embodied in a vacuum filling machine, enables the machine to handle liquids having a tendency to foam when agitated in a simple and efficient manner and eliminates difficulties formerly encountered in handling liquids of this nature. Although described as embodied in a machine operating on the vacuum principle, it will be apparent that the invention may be embodied in other types of filling machines. Although in most instances either a continuous or periodic stream is preferred to dissipate and disperse the accumulated foam in the chambers, in some cases, as above described, the relatively short drain 50 offers such little resistance to normal drainage that sometimes this structure alone suffices to eliminate the foam.

While the preferred embodiment of the invention has been herein illustrated and described, it will be understood that the invention may be embodied in other forms within the scope of the following claims.

Having thus described the invention, what is claimed is:

1. In a container filling machine, in combination, a liquid supply tank, container supporting means, a filling head, an overflow chamber adapted to receive the excess filling liquid from the container, means for draining the excess liquid and accumulated foam from the overflow chamber into said liquid supply tank, said means terminating above the liquid in said liquid supply tank, said liquid supply tank having an enlarged portion adapted to receive and hold said foam until it returns to its liquid form and a partition plate having an opening therein adapted to permit the liquid formed by dissipation of said foam to enter the main body of liquid supply.

2. In a container filling machine, in combination, a liquid supply tank, container supporting means, a filling head, an overflow chamber adapted to receive the excess liquid from the container, means for delivering a stream of liquid into said chamber to wash out any accumulated foam, means for draining the excess liquid and accumulated foam into the supply tank from the overflow chamber, said last named means terminating above the liquid in said liquid supply tank, said liquid supply tank having an enlarged portion adapted to receive and hold said foam until it returns to its liquid form, and a partition plate having an opening therein adapted to permit the liquid formed by dissipation of said foam to enter the main body of liquid supply.

3. In a vacuum filling machine, in combination, container supporting means, a liquid supply, a filling head adapted to fill a container by creating a vacuum therein, an overflow chamber adapted to receive the air and excess liquid from the container, vacuum creating means, means for alternately subjecting the chamber first to vacuum and then to atmospheric pressure, means for draining said chamber and means for releasing a stream of liquid into said chamber during the time when the chamber is under atmospheric pressure.

4. In a vacuum filling machine, in combination, container supporting means, a liquid supply, a filling head adapted to fill a container by creating a vacuum therein, a plurality of overflow chambers adapted to receive the air and excess liquid from the container, vacuum creating means, means for alternately subjecting the chambers first to vacuum and then to atmospheric pressure, means for draining said chambers and means for releasing a stream of filling liquid into said chambers during the time when the chambers are under atmospheric pressure.

5. In a vacuum filling machine, in combination, container supporting means, a liquid supply, a filling head adapted to fill a container by creating a vacuum therein, an overflow chamber adapted to receive the air and excess liquid from the container, vacuum creating means, means for alternately subjecting the chamber first to vacuum and then to atmospheric pressure, means for draining said chamber, and means for delivering a continuous stream of liquid into said chamber during both vacuum and atmospheric periods of operation.

6. In a vacuum filling machine, in combination, container supporting means, a liquid supply, a filling head adapted to fill a container by creating a vacuum therein, two overflow chambers adapted to receive the air and excess liquid from the container, vacuum creating means, means for alternately subjecting the chambers first to vacuum and then to atmospheric pressure, means for draining said chambers, and means for delivering a continuous stream of liquid into said chambers during both vacuum and atmospheric periods of operation.

7. In a vacuum filling machine, in combination, container supporting means, a liquid supply, a filling head adapted to fill a container by creating a vacuum therein, an overflow chamber adapted to receive the air and excess liquid from the container, vacuum creating means, means for alternately subjecting the chamber first to vacuum and then to atmospheric pressure, means for draining said chamber, and a spray head disposed within said chamber arranged to deliver a stream of liquid onto the accumulated liquid and any foam produced therein during the filling operation, whereby to dissipate said foam and to wash it through said draining means when said chamber is open to atmospheric pressure.

8. In a vacuum filling machine, in combination, container supporting means, a liquid supply tank disposed below the container supporting means, a filling head connected to said liquid supply tank and adapted to cooperate with a container supported on the container supporting means and to fill the same by creating a vacuum therein, an overflow chamber disposed above the liquid supply tank and connected to said filling head to receive overflow from said container, means for alternately subjecting the chamber first to vacuum and then to atmospheric pressure, means for automatically returning overflow liquid from the overflow chamber to said liquid supply tank when the overflow chamber is subjected to atmospheric pressure, vacuum creating means for creating a vacuum in the filling head, and means for releasing a stream of liquid in the overflow chamber to dissipate the foam therein.

9. In a container filling machine, in combination, a liquid supply tank, container supporting means, a filling head connected to said liquid supply tank, means for relatively moving the container supporting means and the filling head to apply the filling head to the mouth of the container, an overflow chamber connected with the filling head for receiving excess liquid from the container after the latter has been filled to a predetermined level, means for subjecting said overflow chamber to vacuum for filling said container and alternately to atmospheric pressure, means responsive to increase in pressure in said chamber for automatically returning overflow liquid from the overflow chamber to said liquid supply tank, a spray head disposed in the upper portion of the overflow chamber, and means for introducing liquid through said spray head to dissipate foam in said overflow chamber.

WALTER H. WEEDEN.